Jan. 12, 1965  H. H. HENDRIX, JR  3,164,876
BELL TAMPER FOR CONCRETE PIPE
Filed March 4, 1963  2 Sheets-Sheet 1

INVENTOR.
HAROLD H. HENDRIX, JR
BY
Cushman, Darby & Cushman
ATTORNEYS

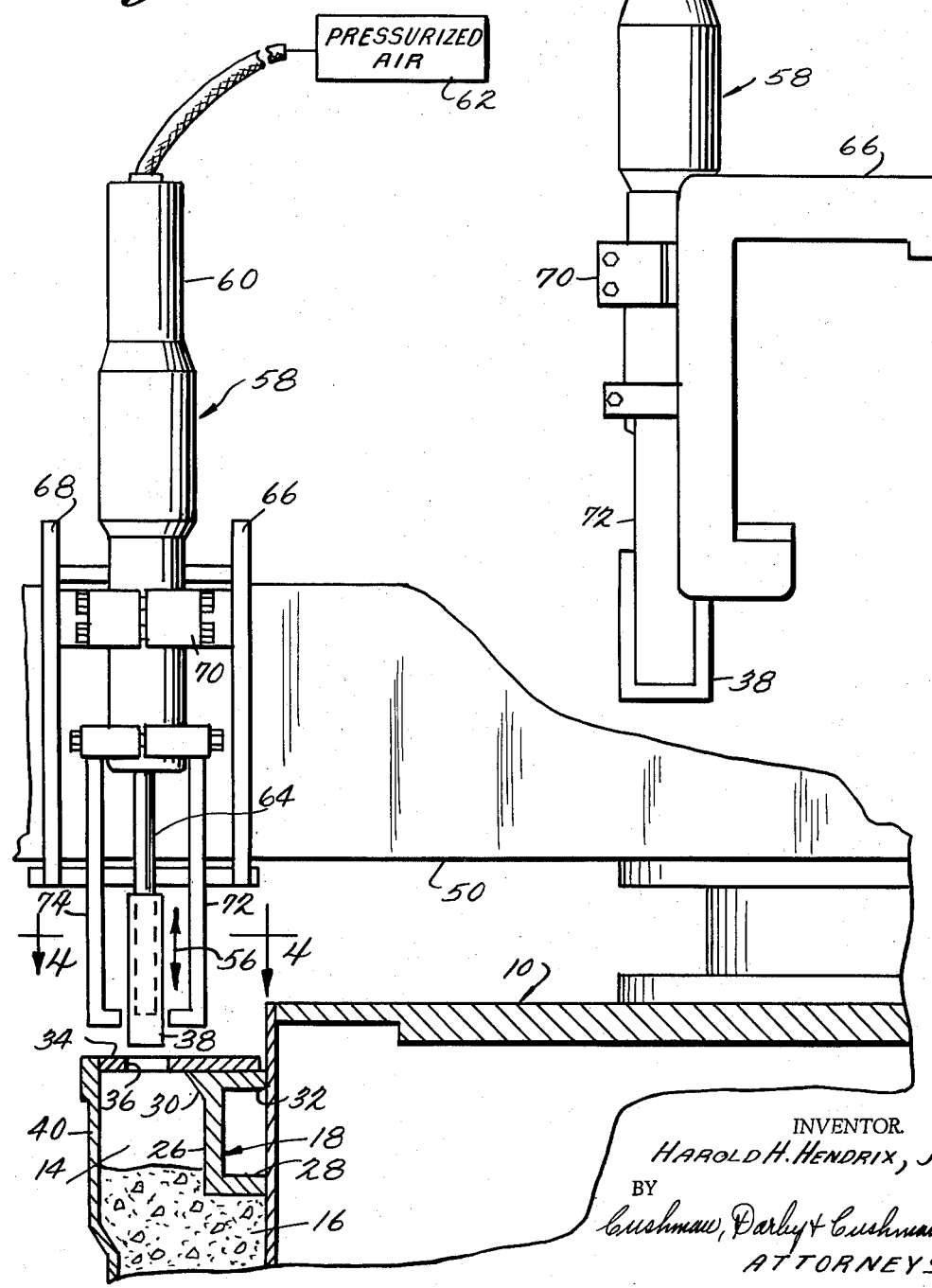

3,164,876
BELL TAMPER FOR CONCRETE PIPE
Harold H. Hendrix, Jr., Dover, Ohio, assignor to United States Concrete Pipe Company, a subsidiary of Pittsburgh Coke & Chemical Company, Pittsburgh, Pa., a company of Pennsylvania
Filed Mar. 4, 1963, Ser. No. 262,689
2 Claims. (Cl. 25—37)

This invention relates to belled pipe, and in particular to apparatus for manufacturing such pipe. More specifically, this invention relates to an improved bell former and tamping apparatus for tamp packing pipe bells during manufacture of belled pipe.

The description concerning this invention proceeds relative to bell and spigot concrete pipe, but it is to be understood that the invention encompasses the manufacture of belled pipe from any suitable type material the density of which can be increased by tamping.

Bell and spigot concrete pipe is formed as a unitary structure having spigot and bell ends. The spigot end has an interior wall which has the same diameter as the shank or body of the pipe, and an exterior wall which has the same diameter as the pipe shank or which may be tapered. The bell end has interior and exterior diameters, which are larger than those of the spigot end, so that when the spigot end of an adjacent pipe is disposed within the bell end, as the pipe sections are assembled together, the joint therebetween permits for substantially uninterrupted fluid flow within the pipe, by precluding the necessity of constricting the interior pipe diameter at the joint. When the exterior wall of the spigot end is tapered the interior of the bell end is tapered complementary thereto.

The interior diameter of the bell end of the pipe is, therefore, greater than the interior diameter of the pipe shank by an amount equal to or slightly greater than twice the thickness of the pipe wall at the spigot end and the exterior diameter of the bell end is sufficiently large to provide a bell end wall having the desired structural strength.

For years it has been common to produce cast bell and spigot concrete pipe by using suitable metal, wooden or other forms, pouring the concrete therein, allowing sufficient time, up to 24 hours or more, for the concrete to set and then removing the pipe from the forms and permitting it to cure.

This process requires that the forms be used continuously for a period of 24 hours or more to produce a single length or section of pipe, and a great many forms are necessary, therefore, to manufacture a relatively few sections of pipe. The process is, accordingly, slow and expensive in use and practice. The shank of cast concrete pipe could be and frequently was reinforced along its length by wire mesh or other means.

Subsequently, it has become more common to provide tamped concrete pipe.

Tamped bell and spigot concrete pipe is also produced by the use of molds or forms of suitable size, shape and material. This process, however, utilizes an extremely viscous concrete slurry, having only about 6 percent moisture, or just slightly more than that necessary for hydration of the concrete. As the viscous concrete slurry is poured into the form, it is repeatedly tamped or impacted, automatically, by mechanical means, so as to compact the concrete to increase its density and thereby its strength and utility.

With tamped concrete pipe the forms may be removed substantially immediately upon completion of the pouring, as the concrete sets at once, using substantially all of the moisture present in the slurry to hydrate and the newly formed concrete pipe immediately has sufficient strength to maintain its own shape and form while curing even though unsupported by the forms necessary for pouring.

Tamped concrete pipe has also been customarily manufactured with reinforcing wire or mesh in the spigot end and pipe shank.

However, production problems, incident to forming the bell end of tamped concrete pipe have effectively precluded providing satisfactory metal reinforcement for the bell ends. Accordingly, it has been common to strengthen the bell end of concrete pipe by making the walls thereof of greater thickness than the walls of the pipe section generally and of the spigot end in particular.

This has not been entirely successful, however, and the bell end of a concrete pipe section has been the weak portion of the structure. Pipe failures and breakage, both during and after installation, have occurred more frequently at the bell end than at any other part of the pipe section.

One approach to the solution of the problem concerning pipe failures and breakage at the bell end is presented in the copending application of Wylie M. Lafferty, Serial No. 107,411, filed May 3, 1961, now Patent No. 3,151,870, which is assigned to the same assignee as the present application. The solution therein involves use of a roller type bell tamper, which includes two rollers. One of these is a compacting roller and the other is a driving roller which has a smaller diameter than the compacting roller. The rollers are integrally concentric, and the driving roller is positioned so that it rides on the upper end of the outer wall which operates as the outer form for the pipe being made. The compacting roller with its larger diameter is adjacent the driving roller and is thereby positioned to fit in between the outer form wall and the outermost extremities of a bell packer which is secured to the inner wall form or core. In addition, both rollers are connected to a yoke which is eccentrically secured to a drive motor for moving the rollers vertically up and down. Consequently, as the concrete or "mud," as it may be called, raises in the form to the area of the pipe bell, the compacting roller engages and positions, flows, compacts, and exerts a vertical downward pressure upon the upper part of the concrete forming the bell being manufactured. The outer form wall is rotated while the mud is poured into the space between it and the core to make the barrel or shank and pipe bell too. When the mud level is high enough to start making the bell, the bell tamper is brought into action. The drive roller thereof is caused to revolve by riding on the rotating outer wall and, in turn, causes the compacting roller to rotate. Periodically the eccentric mounting of the rollers causes them to move upwardly and then back down into pressurized contact with the top end of the outer wall and the pipe bell being manufactured, to effect more tamping and compaction.

Although that arrangement in the Lafferty application is operable and performs satisfactorily, it is more complex and expensive than the apparatus of the present invention, which operates to form a much more dense and better appearing pipe bell. One of the problems with the Lafferty type bell compacters is that tamping is limited to the depth of the bell end corresponding to the difference of radii between the drive and compacting rollers. The downward reach of the compacting roller is limited by the drive roller coming into contact with the top end of the outer form wall. This reach is insufficient many times to make a well-packed, strong bell. Though the reach might be extended by increasing the difference in the roller diameters, such is not generally possible or practical because of the use of reinforcements in the bell above the extended reach of the compacting roller. Not only is the compacting depth limited with the Lafferty type bell compacters, but also the amount of force with which compacting can be accomplished therewith is limited since greater forces tend to ruin the driving roller and its function of rolling on the outer wall to cause rotation of the compacting roller.

It is therefore one of the objects of this invention to provide an improved bell compacting arrangement by which pipe bells can be made extremely dense and strong so as to not break or crack.

Another object is the provision of an improved pipe bell former including a bell packer to which is secured an apertured trowel that extends laterally outwardly to close the space between the outer form wall and the bell packer except for an aperture through which a tamper may be received to effect both packing and troweling of the end of the bell of a pipe as it is being manufactured.

In conjunction with the foregoing objects it is a further object of this invention to provide bell tamping apparatus in the form of a reciprocal tamper operable through the trowel aperture at a rapid rate and with sufficient force and depth to effectively increase the density of the pipe bell until its strength is sufficient to prevent breakage.

Other objects and advantages of this invention will become apparent to those of ordinary skill in the art after reading the appended claims and the following detailed description of the invention in conjunction with the attached disclosure in which:

FIGURE 3 is an elevational view of a portion of FIGURE 2 partially in cross-section, FIGURE 5 is a side elevational view of the tamper shown in FIGURE 3.

Figure 1:
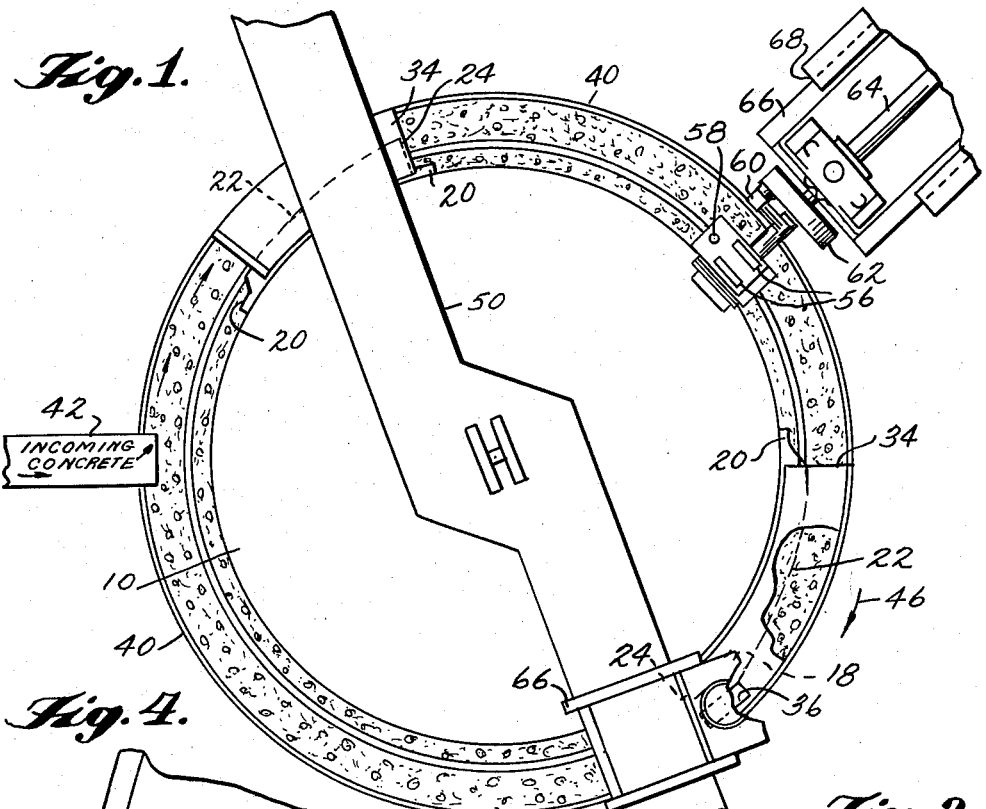
FIGURE 1 is a plan view of equipment embodying this invention.

In the construction illustrated, the pipe forming apparatus for forming both the barrel section and the bell section of concrete pipe, includes an inner wall form or core 10 which is cylindrical as indicated in FIGURES 1 and 3. This core may be solid, or hollow as illustrated in FIGURE 3, as desired, but in any case has an outer periphery 12 which, below the bell end 14, determines the inner shape of the pipe 16 being made. The lower end (not shown) of the periphery 12 of core 10 may be tapered, if desired, in conformance with any taper that is present on the interior wall of the bell end of the pipe, as discussed thoroughly in the aforementioned Lafferty application.

At one or more angular positions around the core periphery 12, at its upper end, are disposed one or more bell packers 18. As shown in FIGURE 1, two packers 18 are secured to the outer periphery of core 10 in diametrically opposed positions, as by welding or bolting via their opposite end flanges 20. In between these flanges, the outer surface 22 of the bell packer gradually increases from a relatively small diameter to a larger diameter at end 24 where it changes back to the flange diameter. In cross-section, bell packer 18 has, for example, an outer wall 26 (FIGURE 3) and a bottom wall 28. The former, at its maximum distance from the core periphery 12 at end 24, defines the inside wall of the pipe bell, while bottom wall 28 defines the shoulder of the pipe bell. As indicated, the upper end of wall 26 may have an outwardly tapering section 30 if desired, and in any event the top of the bell packer includes an upper wall 32.

Figure 4:
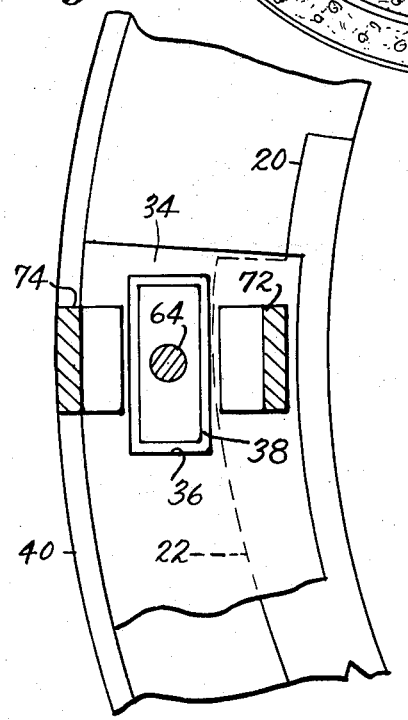
FIGURE 4 is a view taken approximately along the line 4—4 of FIGURE 3.

Bell packers 18, as described, are conventional equipment in belled pipe forming apparatus. Also conventionally employed with such bell packers is a troweling member for troweling the upper end of the pipe bell as it is formed. It is one of the features of this invention that this trowel is retained, yet compaction of the bell end is provided through the trowel itself. In other words, as indicated in FIGURE 3, a trowel 34 is suitably secured to the upper side of the bell packer 18, and in accordance with this invention includes an aperture 36. As shown in FIGURE 4, this aperture is rectangular in shape, and just slightly larger than the tamping shoe 38. Further, trowel 34 fully covers the space between the bell packer 18 and the outer form wall 40, except for aperture 36 (and a slight clearance between trowel 34 and wall 40).

Consideration is now given to the operation which is accomplished by the improved bell former, including the bell packer 18 and apertured trowel 34, and tamping shoe 38.

Figure 2:
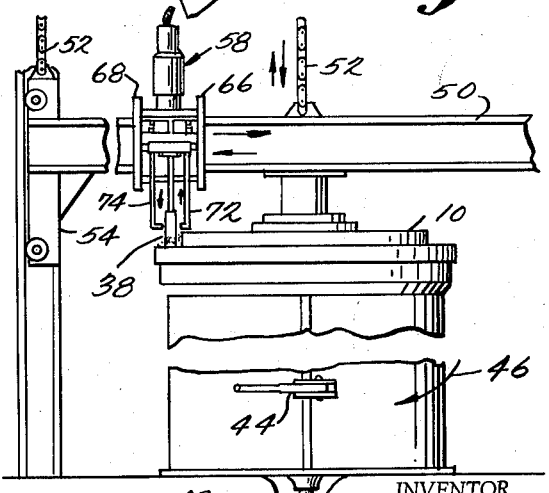
FIGURE 2 is an elevational view of a part of the equipment in FIGURE 1.

First of all, in accordance with well-known prior art, and as indicated in FIGURE 1, concrete mud may be fed into the space between the inner core 10 and outer wall 40 in any conventional manner, as indicated at 42. Furthermore, as will be appreciated by reference to FIGURE 2, the outer wall 40, which may be made in two hinged halves that are secured by latch 44, is rotated, as indicated by arrows 46 in FIGURES 1 and 2, by means such as shaft 48. That is, as fully described in the aforementioned Lafferty application, the outer wall is rotated concentrically about the inner core 10 as the concrete is poured therebetween, to cause the mud to revolve with the outer wall. As shown in FIGURE 2, the inner wall form or core 10 is nonrotatably secured to a cross-beam 50 to which a chain or other means 52 is attached for purposes of lowering and raising core 10, in accordance with a fluid actuated motor 54, all as described in the aforesaid Lafferty application.

In addition, as fully disclosed in that application, there is provided a means for tamping the concrete or mud as it is poured into the space between the outer and inner wall forms for the purpose of making the pipe shank or barrel section sufficiently dense. This means may include two tamper sticks or rods 56 (FIGURE 1) which are frictionally held vertically by a clutch 58. The rods are also disposed in guides (not shown) above and below the clutch, so that when the clutch and rods 56 are restrained to vertical reciprocation when moved by crank arm 60, which is secured eccentrically on the eccentric 62. Eccentric 62 may be rotated by shaft 64, which in turn, is rotated by any conventional motor (not shown). For purposes of adjusting to various size pipe diameters, base member 66 may be moved longitudinally of itself in a suitable way 68 by pneumatically or otherwise operated equipment (not shown). As the lower ends of tamping rods 56 meet with greater resistance because of increased density and hardness of the mud as it is tamp packed by them, the rods are frictionally moved upwards through clutch 58. At such time as the barrel section of the pipe is fully poured and packed, the lower ends of the tamping rods 56 are then in the bell area of the pipe being formed. Since it is at this time when it is desired to start employing the bell tamper, the tamping rods 56 are removed from between core 10 and outer wall 40 (if they are not already removed therefrom by virtue of crank arm 60 causing them to be at their uppermost reciprocal position) so that they will not interfere with the bell as it is being made. These tamper rods 56 may be removed in any desired manner; for example, they may be manually pulled upwards through the frictional clutch 56, or, in some cases, crank arm 60 can be turned to move them up sufficiently high.

The bell tamper of this invention is illustrated in its preferred embodiment as being of the pneumatic type, but it is to be understood that any drive force other than air, for example, mechanical, electrical, steam, etc. can be used as long as the necessary reciprocative force and action indicated by arrow 56 in FIGURE 3 can be duplicated.

In the particular example illustrated in FIGURES 3 and 5, the air tamper 58 includes a head 60 into which works a source 62 of pressurized air to cause the piston 64 to reciprocate rather rapidly, for example, at the rate of about 800 cycles per minute during the initial formation of a pipe bell. Normal stroke length of the tamping shoe 38 is 4 to 6 inches, more or less according to the size pipe and bell being manufactured, and the stroke length shortens as the bell is formed since the shoe 38 cannot move as far through the trowel aperture 36 as the height of the packed mud increases. Shortening of the stroke causes an increase in the tamping frequency, and in turn, a greater density of the resultant pipe bell.

For purposes of mounting the air tamper 58, two C-shaped brackets 66 and 68 are secured around its body by a clamping bracket 70, and the brackets 66 and 68 are suitably secured for transverse sliding movement on the cross-beam 50. This allows the tamper 58 to be utilized for any diameter pipe desired.

To aid the tamping operation, a pair of tamping shoe guides 72, 74 are suitably secured at their upper ends to the body of the tamping mechanism, with their lower ends being inwardly turned to effect the desired guiding of tamping shoe 38.

It is therefore apparent that there has been provided by this invention, apparatus which will simultaneously cause vertical tamping of a pipe bell, troweling thereof, and a lateral packing action due to the bell packer 18. Since the vertical bell tamping action is taking place between the bell packer and the outside revolving form which confines the concrete, there results a more effective use of the tamper along with a consequent greater density and better uniformity in the composition of the bell, than can be obtained with prior art equipment. The present invention not only causes production to be increased because of its greater simplicity in operation than manual or other automatic packing apparatus, but also considerably improves the appearance of the pipe bells. A machine operator can cause the barrel tamper sticks to be removed as soon as the tamped mud gets up high enough and then turn on the pressurized air source 62 to cause the bell tamping equipment 58 to tamp pack the bell while the operator puts in the bell mud. The edges of the pipe bell have a better appearance because the bell tamper beats the stones in the mud down along the edge and lets fine mud out on the edge. This contributes to a better seal of the bells. Of course, tamping with the force available from such an air tamper that operates at a relatively high frequency as previously indicated causes the bells to have a greater density and causes it to be packed or tamped harder, all of which makes for a stronger and more suitable bell pipe.

In addition, because of the improved bell former and tamper of this invention, the inside configuration of the pipe bell becomes much more accurate, thereby allowing for greater sealing effects at pipe joints with rubber gaskets or the like. Concrete pipe of the type which has a single line of reinforcing requires a cage of reinforcing steel to be placed in the bell area separate from the main bell reinforcing, when it is to be used with a rubber gasket. Prior to this invention, it was necessary, in order to get compaction in the bell area, to stop the machine upon completion of the barrel of the pipe, and reposition the barrel tamping sticks or rods on the outside of this cage in order to compact the concrete around the wire. However, with the bell tamper of this invention, such is no longer necessary, as the bell tamper is positioned to tamp in the bell area and can be started as soon as the concrete in the main barrel reaches the bell area. In other words, this invention provides for a much faster way of making belled, completely tamped pipe since there are no delays in changing from the tamping of the barrel section to the tamping of the bell section, while providing sufficient ability in the tamping apparatus to pack not only the barrel section, but also the bell section, to a hardness sufficient to give the desired overall strength to the resultant pipe.

It is therefore apparent that all of the objects and advantages previously mentioned have been provided for by the disclosed features of this invention. However, those of ordinary skill in the art, after reading this disclosure, will appreciate that other objects and advantages and features are encompassed by this invention, and it is to be understood that the foregoing disclosure is to be considered exemplary and not limitative, the invention being defined by the spirit and scope of the appended claims.

What is claimed is:

1. Apparatus for manufacturing belled pipe of a type material which needs tamping during forming to impart desired strength to the pipe, comprising: a cylindrical core for forming an inner wall for the pipe generally, at least one bell packer fixedly secured to extend outwardly from a portion of the periphery of said cores at one end thereof for forming the inside wall and shoulder of the bell of said pipe, a cylindrical outer form spaced from said core and bell packer for forming the outer wall of the pipe including its bell, an apertured trowel fixedly secured to and extending from the outer end of said bell packer to said outer wall form for closing the space therebetween except for an aperture which is narrower and shorter than that space, tamping means having a reciprocable tamper and being fixedly mounted relative to said core so that the tamper reciprocates through the said trowel aperture to effect packing and troweling of concrete disposed between said bell packer and outer form to increase the density of the pipe bell, and means for relatively rotating said core and outer wall form to cause the said packing and troweling by the tamping means and trowel to be effected around the full circumference of the bell as it is being formed.

2. Apparatus for manufacturing pieces of pipe, each of which has a cylinder section integrally joined at one end to a bell section, of a type material which needs tamping during forming to impart desired strength to the pipe, comprising: a cylindrical core mounted vertically for forming the inner wall of said pipe cylinder section, a cylindrical outer form spaced from said core and bell former for forming the outer wall of the complete pipe, means for rotating the said outer form concentrically about the said core, means at a first angular position for filling the space between said core and outer form via the upper end thereof with said pipe material, means at a second angular position for tamping the pipe material as the said cylinder section is being formed, said tamping means being retractable completely out of the space between said core and outer form, at least one bell packer effectively having side and bottom walls fixedly secured at a third angular position to extend laterally from a portion of the periphery of said core at the upper end thereof for forming the inside wall and shoulder of the pipe bell section, an apertured trowel fixedly secured to and extending from the top of said bell packer to said outer wall form for closing the space therebetween except for a vertically extending aperture which is narrower and shorter than that space, second tamping means having a vertically reciprocable tamper and being fixedly mounted relative to said core generally in said third angular position so that the said tamper can reciprocate through the said trowel aperture, and means for causing the said tamper of the second tamping means to reciprocate as aforesaid to effect tamp packing and trowelling of the pipe bell section after packing of the said cylinder section by the first mentioned tamping means and full withdrawal thereof from between the said core and outer wall form.

References Cited by the Examiner

UNITED STATES PATENTS

| | | | |
|---|---|---|---|
| 1,211,787 | 1/17 | Thomas | 25—37 |
| 1,750,138 | 3/30 | Sorensen | 25—37 |
| 2,870,513 | 1/59 | Gagne | 25—39 |

FOREIGN PATENTS

| | | |
|---|---|---|
| 44,464 | 8/18 | Sweden. |
| 56,317 | 11/12 | Austria. |
| 421,583 | 12/34 | Great Britain. |

MICHAEL V. BRINDISI, *Primary Examiner.*

ROBERT F. WHITE, *Examiner.*